United States Patent Office 2,957,818
Patented Oct. 25, 1960

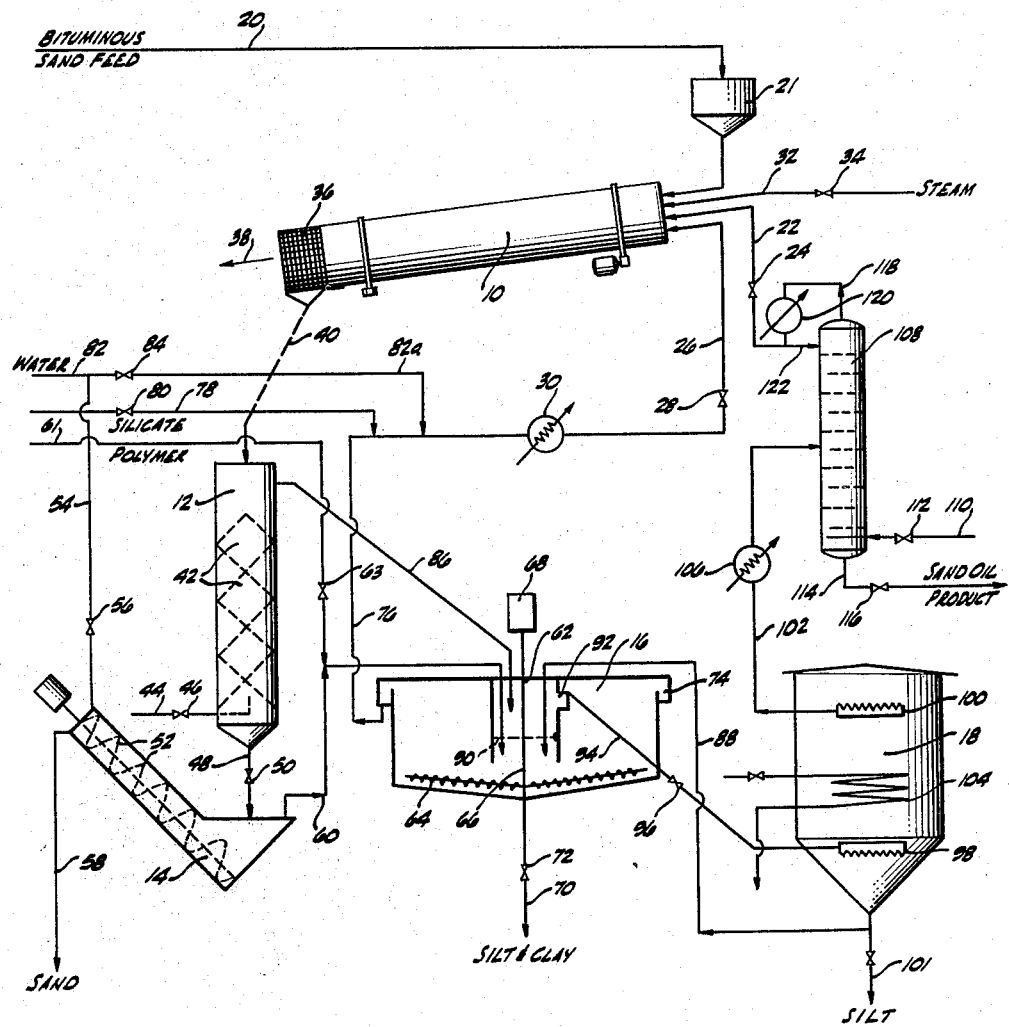

2,957,818

PROCESSING OF BITUMINOUS SANDS

Paul W. Fischer, Whittier, Calif., assignor to Union Oil Company of California, Los Angeles, Calif., a corporation of California Filed Dec. 19, 1958, Ser. No. 781,652

13 Claims. (Cl. 208—11)

This invention relates to the processing of bituminous sands and the like to recover hydrocarbon values therefrom, and in particular relates to a process wherein clay-containing bituminous solids are treated with a recirculated aqueous lixiviating agent and the latter is treated to separate suspended clay.

Extensive deposits of tar sands and similar bituminous solids are known to exist in a number of localities, and many attempts have been made to treat such solids to recover the hydrocarbon values. For the most part, such solids comprise a silicious matrix, e.g., sand or sandstone, saturated with relatively heavy viscous hydrocarbons which closely resemble heavy crude petroleum. In many instances they also contain appreciable quantities of clay, usually of the illite variety. Among the various methods which have been proposed for recovering such hydrocarbons, those which involve leaching or pulping the solids with an aqueous sodium silicate lixiviating agent followed by gravity separation of the oil, lixiviating agent and solids have shown definite commercial promise. However, in view of the large quantity of solids which must be processed to recover a unit volume of oil and of the large quantity of aqueous sodium silicate required to treat a unit volume of solids, economic considerations dictate that the aqueous silicate solution be re-employed and recirculated within the system. Consequently, it is necessary to attain complete separation of solids from the aqueous sodium silicate; otherwise, such solids build up within the system and eventually require a complete shut-down. For this reason, probably the most critical of the processing steps is that of separating the solids from the pulped mixture of solids, oil and aqueous sodium silicate, and it is for the same reason that perhaps the majority of the art is concerned with various methods and apparatus for effecting such separation. Certain of the methods and apparatus which have been developed for such purpose have proved quite successful when the solids consist substantially only of silicious materials such as sand, diatomaceous earth, etc. However, few, if any, of such methods and apparatus operate satisfactorily when the solids also comprise clay. The latter disperses in the aqueous sodium silicate solution to form colloidal dispersions which are impossible to flocculate by mechanical methods alone.

It is accordingly an object of the present invention to provide a means for separating clays from a pulped mixture of bituminous solids and aqueous sodium silicate.

A further object is to provide an improved method for recovering the hydrocarbon values from bituminous solids such as tar sands and the like.

Other objects will be apparent from the following detailed description of the invention, and various advantages will occur to those skilled in the art upon employment of the invention in practice.

I have now found that the foregoing objects and their attendant advantages may be realized through the use of a particular water-soluble polymeric material to flocculate the clays which become colloidally dispersed in the circulating aqueous sodium silicate stream. More particularly, I have found that, in a process wherein clay-containing bituminous solids are reduced to a fluid pulp by agitation in the presence of aqueous sodium silicate at slightly elevated temperatures and the resulting pulp is mechanically treated, e.g. by gravity settling or centrifuging, to separate a solids fraction, a hydrocarbon oil fraction, and an aqueous sodium silicate fraction which is recycled to the aforesaid pulping step, the buildup of clay in said sodium silicate recycle stream can be substantially completely prevented by adding to said pulp a small amount of a water-soluble polymeric alkylene oxide. The latter material serves to flocculate the clay which otherwise remains colloidally suspended in the circulating stream of sodium silicate, and allows such clay to be separated along with the non-clay solids in the separation step.

The single figure of the accompanying drawing which forms a part of this application is a schematic flow diagram illustrating the process of the invention in its preferred embodiment.

Considering now the process of the invention in further detail, the alkylene oxide polymers which are employed to effect the removal of clays from the processing system as described above are water-soluble polymers of alkylene oxides containing from 2 to 4 carbon atoms, i.e., ethylene oxide, the propylene oxides (1,2-propylene oxide and trimethylene oxide), and the butylene oxides (isobutylene oxide, 1,2-epoxybutane and 2,3-epoxybutane), which polymers have molecular weights such that a 5 percent by weight aqueous solution of the same has a viscosity of at least about 200 centipoises at 20° C. Such polymers are colorless thermoplastic resins, and have a highly ordered crystalline structure. They are obtained by subjecting the monomeric alkylene oxide, usually in admixture with a diluent such as butane, to somewhat elevated temperatures in the presence of an active alkaline-earth metal carbonate catalyst. Alkaline-earth derivatives of organic mono- and poly-hydroxy compounds, e.g., strontium methylate, calcium glycolate, etc., may also be employed as catalysts. The polymers range in molecular weight from as low as 50,000 up to several million, and the viscosities of their aqueous solutions vary accordingly from as low as about 200 centipoises at 5 percent concentration to as high as 7000 or more centipoises at 1 percent concentration. While any of such polymerized alkylene oxides may be employed in the practice of the invention, it is preferred to employ polymerized ethylene oxide of such molecular weight that a 5 percent by weight aqueous solution of the same has a viscosity between about 500 and about 4000 centipoises at 20° C. Such a product is available commercially under the general trade name "Polyox" (Union Carbide Chemicals Co.) and can be obtained in several specific viscosity grades.

In addition to the alkylene oxide homopolymers referred to above, there may also be employed copolymers of such alkylene oxides with each other as well as with other polymerizable epoxy compounds, e.g., styrene oxide, butadiene oxide, etc. The term "polymer of an alkylene oxide" is herein employed to designate the aforementioned homopolymers as well as such copolymers.

The present alkylene oxide polymers may be introduced into the bituminous solids processing system either in solid or solution form. It is preferred, however, to employ them in the form of a relatively dilute, e.g. 0.1–5 percent by weight, aqueous solution.

The amount of polymer employed should of course be sufficient to flocculate substantially all of the clay introduced into the system. Numerically, such amount will depend primarily upon the amount of clay introduced into the system, but the nature of the clay itself, the concentration and nature of the sodium silicate solution, the amount of sodium silicate solution employed per unit weight of bituminous solids, and the temperature at which the pulping and separation operations are effected all contribute to the requirements of any particular system. In general, however, between about 0.1 and about 5 pounds of the polymer are employed per ton of clay introduced into the system.

The point within the processing system where the polymer is introduced is not of critical importance, i.e., it may be introduced directly into the pulper, into the stream of sodium silicate solution which is re-circulated to the pulper, into the stream of pulp as it is being transferred from the pulping step to the separation step, or into the separation step itself. Usually, however, most processing systems effect the separation in two stages: (1) a primary separation step in which the larger-size solid particles are separated from the pulp, and (2) a secondary separation step in which the more finely-divided solid particles, i.e., silt, are separated. In systems of this type it is preferred to introduce the polymer into the system at the secondary separation step.

Referring now to the accompanying drawing which illustrates the operation of a preferred embodiment of the process of the invention as applied, by way of specific example, to the processing of a tar sand taken from deposits at Sisquoc, California, said sand contains about 30 gallons per ton of 4° API bitumen, and comprises about 2 percent by weight of illite clay. Essentially, the equipment employed comprises pulper 10, primary separator 12, sand washer 14, secondary separator 16, and product settler 19, together with certain associated equipment hereinafter described. The raw sand is introduced into pulper 10 by means of conveyor 20 at a rate of about 200 tons/day controlled by solids feeder 21. A light hydrocarbon oil (26° API coker gas-oil), previously heated to about 180° F., is introduced into pulper 10 through line 22 at a rate of about 191 barrels per day controlled by valve 24. A stream of aqueous sodium silicate solution heated to about 180° F. in heater 30, is introduced into pulper 10 through line 26 at a rate of about 286 barrels per day controlled by valve 28. The aqueous sodium silicate solution contains about 4.2 pounds per gallon of sodium silicate having a $Na_2O$ to $SiO_2$ mole ratio of about 0.55. In order to maintain a pulping temperature of about 180° F. within pulper 10, steam is introduced thereinto through line 32 at a rate of about 482 pounds per hour controlled by valve 34. Pulper 10 is of such length that the solids pass therethrough in about 0.25 hour, and under the particular conditions employed, such time is sufficient to reduce the bituminous solids to a substantially homogeneous fluid pulp and to leach from the solids at least about 90% of the hydrocarbon values contained therein.

The discharge end of pulper 10 is provided with a trash screen 36 by means of which rocks and agglomerated lumps of tar sand are discharged from the system by means of conveyor 38. The fluid pulp which is discharged through trash screen 36 comprises about 20% of separated oil, 20% of aqueous sodium silicate and about 60% of sand, and is passed to primary separator 12 via line 40. The primary separator is operated at a temperature only a few degrees below that of the pulper by making line 40 as short as possible and providing for the immediate transfer of the pulp from the pulper into the primary separator.

Within primary separator 12, which takes the form of an elongated vertical vessel provided by internal baffles 42 and a conical bottom, the majority of the solids contained in the pulp slowly settle out and are withdrawn through line 48. In passing over baffles 42, the settling sand is subjected to gentle agitation which serves to liberate mechanically entrained drops of liquid from the sand stream. If desired, additional agitation may be provided by introducing aqueous sodium silicate into the lower part of separator 12 from line 44 at a rate controlled by valve 46.

The sand which settles in the bottom of separator 12 is withdrawn through line 48 at a rate controlled by density valve 50, and is passed into sand washer 14 at a rate of about 172 tons per day along with about 193 barrels per day of the sodium silicate solution. In washer 14 the sand is conveyed upwardly by means of conveyor 52 countercurrent to a stream of fresh water introduced from line 82 through line 54 at a rate controlled by valve 56. The quantity of water introduced into the top of washer 14 preferably constitutes all of the make-up water added to the system; however, provision is made for introducing make-up water from line 82 into the recirculated sodium silicate stream via line 82a at a rate controlled by valve 84. Clean oil-free sand is discharged from washer 14 via line 58, and is conveyed by conventional means to a suitable disposal point. The wash water, together with the aqueous sodium silicate which is introduced into washer 14 along with the sand, is withdrawn from washer 14 and passed to secondary separator 16 via line 60. This stream flows at a rate of about 1169 barrels per day and contains about 5 tons per day of sand and 1 barrel per day of oil. The polymeric flocculating agent is a 0.7 percent by weight aqueous solution of polymerized ethylene oxide of such molecular weight that a 5 percent by weight aqueous solution has a viscosity of about 2000 centipoises. This polymer solution is introduced into line 60 from line 61 at a rate of about 570 pounds per day controlled by valve 63.

The secondary separator consists essentially of a cylindrical vessel provided internally with coaxial central well 62 into which all of the feed streams are introduced. The floor of secondary separator 16 is provided with a plurality of radial raked arms which are slowly rotated by means of a vertical central shaft 66 driven by motor 68. The volume of central well 62 is such that the residence time of the fluids passing therethrough is about one hour, whereas the volume of the annular space outside well 62 is such that the fluids introduced thereinto have a residence time of about 6 hours. Rake arms 64 move the settled silt and flocculated clay as a thickened sludge radially inward toward discharge line 70 through which the silt and clay are withdrawn at a rate controlled by valve 72. The thickened sludge comprises about 87 barrels per day of water and about 15 tons per day of finely-divided solids, including clay. The thickened sludge is passed through line 70 to a tailings pond from which any recoverable water is separated and returned to the process, e.g., to secondary separator 16.

In addition to the wash water, aqueous sodium silicate, and polymer solution introduced via line 60, central well 62 of secondary separator 16 also receives via line 86 the hydrocarbon oil and aqueous sodium silicate which separates as a supernatant liquid layer in primary separator 12. This stream flows at a rate of about 1081 barrels per day and comprises 754 barrels per day of water, 327 barrels per day of oil, and about 12 tons per day of colloidally dispersed silt and clay.

Central well 62 of separator 16 also receives, via line 88, a stream of water taken from the bottom of product settler 18 at a rate of about 68 barrels per day.

Within central well 62 the broken line 90 indicates the approximate position of the interface between aqueous sodium silicate and the hydrocarbon oil. Interface 90 is maintained at a position about ⅔ of the way down in the central well, and those fluid streams which contain only small quantities of oil, i.e., the streams flowing in line 60 and 88, are introduced below the level of interface 90. On the other hand, the stream flowing through line 86 contains about 30 percent by volume of oil, and is introduced into well 62 at a level above that of interface 90. The location of the latter is suitably detected continuously, and in maintained at the proper level by suitably controlling the rate at which the supernatant oil layer is withdrawn. The wet oil product which separates within central well 62 of separator 16 is drawn off through weir box 92 via line 94 at a rate of about 409 barrels per day controlled by valve 96, and is passed to feed distributor 98 of product settler 18. Said product contains about 328 barrels per day of oil, 80 barrels per day of water, and a small amount of silt.

The clear water effluent which separates in the annulus of secondary separator 16 collects in collector ring 74 surrounding the upper periphery of separator 16, and is withdrawn therefrom via line 76 at a rate of about 1821 barrels per day. This stream constitutes the recirculated stream of aqueous sodium silicate which is returned to pulper 10 via heater 30 and line 26 as previously described. Make-up silicate solution is introduced into line 76 from line 78 at a rate of 2.5 gallons per hour controlled by valve 80.

Product settler 18 consists of a cylindrical vessel fitted with a conical bottom and an internal heating coil 104 which is supplied with steam for heating the contents of the settler to a temperature of about 155° F. The volume of settler 18 is sufficient to permit a settling time of about 12 hours. Within settler 18, the wet oil product separates into a supernatant oil layer and a subnatant aqueous layer. The latter is removed from the bottom of settler 18 and is returned to secondary separator 16 via line 88. It consists essentially only of water containing traces of silt. A small quantity of silt is taken from the bottom of the settler via line 101. The dry oil is removed from the upper part of settler 18 via take-off weir 100 and is passed to distillation column 108 through line 102 and heat exchanger 106. The dry oil product in line 102 contains about 321 barrels per day of oil, 2 barrels per day of water, and 0.1 ton per day of silt.

Distillation column 108 is conventional, being provided at the bottom with stripping gas inlet 110 and control valve 112. Steam is conventionally employed as the stripping gas. The overhead vapor, which consists of recovered diluent oil, is taken from column 108 via line 118 and is passed through condenser 120. Part of the condensate is returned to the column via line 122 as reflux, and the remainder is passed to pulper 10 via valve 21 and line 22 together with make-up diluent oil added from a make-up line not shown. The recovered bitumen product is taken from column 108 as a bottoms fraction via line 114 at a rate of 137 barrels per day controlled by valve 116. This product has the following characteristics:

| | |
|---|---|
| Viscosity, SUS, at 180° F. | 50,000 |
| Carbon residue, percent by wt. | 16.05 |
| Sulfur, percent by wt. | 4.4 |
| Nitrogen, percent by wt. | 0.95 |
| Gravity, ° API | 4.4 |

In the operation just described, the clay content of the recycled silicate solution is determined empirically by centrifuging a sample of the solution for 30 minutes, and noting the volume of the sludge which is thereby separated. The volume of clay in the sample has been found to be about 1/10 the volume of the sludge. When the polymeric flocculating agent was employed at the rate of about 1 lb./ton of clay introduced into the system, the amount of clay contained in the recirculated silicate stream remained substantially constant at about 0.4% over a 16-day operating period. Previously, when no polymer was employed, this value varied from about 1.5% to as high as 2.5%. When the latter value was reached, it became necessary to shut down the plant.

In the foregoing specific example of the process of the invention, the sodium silicate solution was prepared by suitable dilution of special concentrate material known commercially as "Silicate 120." This material is a 36% by weight aqueous solution of a high basicity sodium silicate having a $Na_2O$ to $SiO_2$ mole ratio of about 0.55. Other alkali-metal silicates may be employed, but it is preferred that the one mole ratio of alkali-metal oxide to silicon di-oxide be greater than about 0.4. Usually, the silicate solution will contain between about 0.2 and about 7 pounds of the alkali-metal silicate per barrel of solution, and between about 0.75 and about 5 barrels of the solution are employed per ton of solids. The diluent oil may be any light hydrocarbon oil, and is suitably employed in such amount that the recovered bitumen has an API gravity greater than about 10°. The pulping temperature is maintained above about 160° F., preferably above about 180° F., but will not ordinarily be above about 250° F. The separation operation is likewise carried out at moderately elevated temperatures, usually at 140°–180° F.

While the process of the invention has been described above by way of specific example in connection with a particular processing system, it should be understood that it is broadly applicable to any bituminous solids processing operation wherein it becomes necessary to remove colloidally dispersed clay from an alkali-metal silicate solution containing relatively small amounts of hydrocarbon oil or bitumen. The particular identity of the lixiviating and/or separation operation is not critical so long as such a clay-contaminated silicate solution is encountered, and the process of the invention is thus applicable to such recovery systems as those described in U.S. Patents 2,825,677 and 2,453,060 and others.

While use of the present polymeric flocculating agents in the manner described above will in all cases effect a very substantial reduction in the amount of clay which remains suspended in the recirculated silicate stream, in aggravated instances, e.g., when the bituminous solids contain relatively large amounts of clay, the effect of the polymer material can be enhanced by adding calcium ion to the silicate stream. Any water-soluble calcium compound, e.g., calcium chloride, calcium nitrate, calcium sulfate, calcium citrate, lime, etc., may be employed in an amount ranging from about 0.005 to about 0.5 lb./bbl. of recycled silicate solution.

Other modes of applying the principle of my invention may be employed instead of those explained, change being made as regards the methods or materials employed, provided the step or steps stated by any of the following claims, or the equivalent of such stated step or steps, be employed.

I, therefore, particularly point out and distinctly claim as my invention:

1. In a process for the recovery of hydrocarbon values from clay-containing petroliferous mineral solids wherein (1) said solids are agitated with an aqueous alkali-metal silicate solution and a light hydrocarbon diluent at a moderately elevated temperature for a period of time sufficient to reduce said solids to a substantially homogeneous pulp, (2) said pulp is treated to separate a solids phase, a liquid hydrocarbon phase, and an aqueous alkali-metal silicate phase, (3) the separated aqueous alkali-metal silicate phase is recycled to the aforesaid step (1), and (4) said separation treatment is such that colloidally dispersed clay accumulates in said recycled aqueous alkali-metal silicate, the method of substantially reducing said accumulation which comprises adding to said aqueous alkali-metal silicate solution a water-soluble polymer of an alkylene oxide selected from the class consisting of ethylene oxide, the propylene oxides and the butylene oxides, said polymer having a molecular weight such that a five percent by weight aqueous solution thereof has a viscosity of at least about 200 centipoises at 20° C. and said polymer being employed in an amount sufficient to effect a substantial reduction in the amount of clay colloidally dispersed in said aqueous alkali-metal silicate.

2. A process as defined by claim 1 wherein the said polymer is a homopolymer of ethylene oxide.

3. A process as defined by claim 1 wherein said polymer is employed in an amount corresponding to between about 0.1 and about 5 pounds per ton of clay contained in said solids.

4. A process as defined by claim 1 wherein said aqueous alkali-metal silicate solution contains between 0.2 and about 7 pounds per barrel of sodium silicate in which the mole ratio of $Na_2O$ to $SiO_2$ is above about 0.4.

5. A process as defined by claim 1 wherein said polymer is a homopolymer of ethylene oxide having a molecular weight such that a 5 percent by weight aqueous solution thereof has a viscosity between about 500 and about 4000 centipoises at 20° C., and said polymer is employed in the form of an aqueous solution of between about 0.1 percent and about 5 percent by weight concentration.

6. A process as defined by claim 1 wherein said separation treatment comprises a first step wherein said pulp is subjected to gravity settling to separate the majority of the solids contained therein and a heterogeneous liquid phase, and a second step wherein said heterogeneous liquid phase is separated into a hydrocarbon phase and an aqueous alkali-metal silicate phase.

7. A process as defined by claim 6 wherein said polymer is introduced into the system between said first step and said second step.

8. A process as defined by claim 6 wherein said polymer is a homopolymer of ethylene oxide.

9. A process as defined by claim 6 wherein said aqueous alkali-metal silicate solution is an aqueous sodium silicate solution containing between about 0.2 and about 7 pounds per barrel of a sodium silicate in which the mole ratio of $Na_2O$ to $SiO_2$ is greater than about 0.4.

10. A process as defined by claim 9 wherein said polymer is a homopolymer of ethylene oxide and is employed in an amount corresponding to between about 0.1 and about 5 pounds per ton of clay contained in said solids.

11. A process for recovering hydrocarbon values from clay-containing petroliferous solids which comprises: (1) agitating said solids with an aqueous sodium silcate soluton and a relatively light hydrocarbon diluent at a temperature between about 180° F. and about 250° F. for a period of time sufficient to reduce the solids to a substantially homogeneous pulp, said aqueous sodium silicate solution being employed in an amount corresponding to between about 0.75 and about 5 barrels per ton of solids and containing between about 0.2 and about 7 pounds per barrel of a sodium silicate in which the mole ratio of $Na_2O$ to $SiO_2$ is greater than about 0.4; (2) subjecting said pulp to gravity settling to obtain a settled solids phase and a heterogeneous liquid phase comprising liquid hydrocarbons and aqueous sodium silicate; (3) washing said separated solids with substantially fresh water; (4) adding to the wash water an aqueous solution of a homopolymer of ethylene oxide; (5) introducing the polymer-containing wash water and said heterogeneous liquid phase into a separation zone wherein there is separated a thickened sludge comprising silt and clay, a hydrocarbon oil phase, and an aqueous sodium silicate phase; and (6) returning said separated aqueous sodium silicate phase to the aforesaid step (1); said homopolymer having a molecular weight such that a 5 percent aqueous solution thereof has a viscosity between about 500 and about 4000 centipoises at 20° C. and soid homopolymer being employed in an amount corresponding to between about 0.1 and 5 pounds per ton of clay contained in said solids.

12. A process as defined by claim 1 wherein a water-soluble calcium compound is added to said aqueous alkali-metal silicate solution in an amount representing between about 0.005 and about 0.5 pound per barrel of said sodium silicate solution.

13. A process as defined by claim 11 wherein a water-soluble calcium compound is added to said aqueous alkali-metal silicate solution in an amount representing between about 0.005 and about 0.5 pound per barrel of said sodium silicate solution.

References Cited in the file of this patent

UNITED STATES PATENTS

| | | |
|---|---|---|
| 1,791,797 | Clark | Feb. 10, 1931 |
| 2,453,060 | Bauer et al. | Nov. 2, 1948 |

OTHER REFERENCES

Schweitzer: Rubber Chemistry and Technology, vol. 13, 1940, pp. 408–414, pages 412 and 413 only relied on.